(12) United States Patent
Instone (10) Patent No.: US 10,975,664 B2
(45) Date of Patent: Apr. 13, 2021

(54) WELL OR BORE CLEARING TOOL

(71) Applicant: ANCOR-LOC (NZ) LIMITED, Te Awamutu (NZ)

(72) Inventor: Kurt Murray Instone, Te Awamutu (NZ)

(73) Assignee: ANCOR-LOC (NZ) LIMITED, Te Awamutu (NZ)

( * ) Notice: Subject to any disclaimer, the term of this patent is extended or adjusted under 35 U.S.C. 154(b) by 3 days.

(21) Appl. No.: 16/544,043

(22) Filed: Aug. 19, 2019

(65) Prior Publication Data
US 2020/0056454 A1 Feb. 20, 2020

(30) Foreign Application Priority Data

Aug. 17, 2018 (NZ) .......................... 745420
Dec. 10, 2018 (NZ) .......................... 749149

(51) Int. Cl.
*E21B 37/04* (2006.01)
*E21B 10/36* (2006.01)
*E21B 1/38* (2006.01)
*E21B 10/38* (2006.01)
*E21B 10/60* (2006.01)
*F24T 50/00* (2018.01)

(52) U.S. Cl.
CPC ................ *E21B 37/04* (2013.01); *E21B 1/38* (2020.05); *E21B 10/36* (2013.01); *E21B 10/38* (2013.01); *E21B 10/60* (2013.01); *F24T 50/00* (2018.05)

(58) Field of Classification Search
CPC . E21B 1/38; E21B 10/36; E21B 10/38; E21B 10/60
See application file for complete search history.

(56) References Cited

U.S. PATENT DOCUMENTS 4,223,747 A 9/1980 Marais
4,275,794 A 6/1981 Carbonaro
(Continued)

FOREIGN PATENT DOCUMENTS

CA 1 150 720 7/1983
CA 2 657 211 1/2008
(Continued)

OTHER PUBLICATIONS

Icelandic Search Report—EU.9124—dated Jan. 6, 2020.
(Continued)

*Primary Examiner* — Tara Schimpf (74) *Attorney, Agent, or Firm* — Nixon & Vanderhye (57) ABSTRACT

For clearing of the bore liners of geothermal wells, disclosed is a clearing tool that can be used without a drive motor, but with a drive hammer, to clear mineral deposits from the inside of the bore liners of geothermal wells. A forward end clears unwanted material from a live well. An aft end engages with a hammer device. The tool also has working surfaces to bear against and to cut through or to break up the unwanted material, at least one bypass passage conveying fluid from the live well through the clearing tool, and at least one exhaust passage communicating with the hammer device and conveying exhaust gases from the hammer to exhaust exit ports. The location of at least one exhaust exit port is a location that is situated aft of a forward face of the forward end of the clearing tool.

20 Claims, 9 Drawing Sheets

(56) References Cited

U.S. PATENT DOCUMENTS

| | | |
|---|---|---|
| 5,025,875 A | 6/1991 | Witt |
| 6,112,833 A | 9/2000 | Lambert |
| 2009/0301744 A1 | 12/2009 | Swinford |
| 2010/0147594 A1 | 6/2010 | Ben Lamin et al. |
| 2013/0161102 A1 | 6/2013 | Zhou |
| 2014/0131116 A1 | 5/2014 | Lyon |
| 2015/0300094 A1* | 10/2015 | Hisada .................. E21B 10/40 175/402 |
| 2016/0130879 A1* | 5/2016 | Gylling ................. E21B 17/00 166/380 |
| 2018/0223616 A1* | 8/2018 | Messa ................. E21B 29/002 |

FOREIGN PATENT DOCUMENTS

| | | |
|---|---|---|
| CN | 201103343 Y | 8/2008 |
| CN | 204386475 | 6/2015 |
| CN | 206111094 | 4/2017 |
| CN | 206503562 | 9/2017 |
| EP | 1 373 675 B1 | 1/2004 |
| EP | 2 006 043 | 12/2008 |
| SE | 1750405 A1 | 10/2017 |
| WO | WO00/57019 | 9/2000 |
| WO | 2006/131339 A1 | 12/2006 |
| WO | WO2012/038583 | 3/2012 |

OTHER PUBLICATIONS

Icelandic Search Opinion—EU.9134—dated Jan. 6, 2020.
Examination Report issued in Icelandic Patent Application No. 9124 by the Danish Patent and Trademark Office dated Jul. 14, 2020.
Search Report issued in Icelandic Patent Application No. 9124 by the Danish Patent and Trademark Office dated Jul. 13, 2020.

* cited by examiner

FIGURE 9

WELL OR BORE CLEARING TOOL

FIELD OF THE INVENTION

This invention relates to a well or bore clearing tool or drill bit, and in particular, but not exclusively to a method of drilling or bore clearing, and a drilling or bore clearing tool or drill bit, for clearing wells and the bore of pipes used in the geothermal industry, and for related drilling operations.

BACKGROUND

The inside diameter of geothermal wells and pipelines becomes clogged with mineral deposits (calcides) that are laid down by the steam over time. If the wells or pipelines are not cleaned on a regular basis, they can become completely blocked over a period of years.

Geothermal wells are particularly prone to becoming clogged with mineral deposits at points in the wells where hot water feeds into the well from a geothermal field and through entry holes provided in the steel well liner tubes. The super-heated water flashes into steam as it passes through the entry holes in the steel well liner tubes. As the hot water flashes into steam, some of the minerals in the fluid are deposited on the sides of the well liner tubes. It is these build-ups of minerals, often including calcides, that grow to the point that they restrict flow from the geothermal wells.

It is important that as few fragments of material are left on the inside of the bore as possible during cleaning operations. Any fragments that are left become the starting points for new build ups on the inside of the bore. If the bore can be cleaned completely, it takes longer for the deposits to build up to a point where they restrict flow out of the wells.

These mineral deposits are very hard, and rock drilling equipment of the type that is used to drill new wells is often used to regularly clear or clean the wells. These clean out operations are often carried out annually to ensure the efficient operation of geothermal wells for the purpose of producing electricity. The cost of these cleanout operations can typically be in the order of millions of dollars.

The cost of the 'clearout' operations can be reduced to some extent if the wells can be cleared while they are live, that is, while the wells are hot and steam continues to flow out of the wells. This eliminates the need to cool or quench the wells prior to the cleanout operations, which is a costly and time consuming process in itself. Such a process also eliminates productions losses that occur during the time. Sometimes weeks, that it takes for a quenched well to resume normal steam output.

Conventional drilling equipment however is not designed to operate in live wells. The pressure of the steam that is rising out of a live well can adversely affect the efficiency of the drilling equipment.

In this specification unless the contrary is expressly stated, where a document, act or item of knowledge is referred to or discussed, this reference or discussion is not an admission that the document, act or item of knowledge or any combination thereof was at the priority date, publicly available, known to the public, part of common general knowledge; or known to be relevant to an attempt to solve any problem with which this specification is concerned.

OBJECT

It is therefore an object of the present invention to provide a well or bore clearing tool or drill bit, which will at least go some way towards overcoming one or more of the above mentioned problems, or at least provide the public with a useful choice.

STATEMENTS OF THE INVENTION

Accordingly, in a first aspect, the invention may broadly be said to consist in a clearing tool for clearing live wells or bores, the clearing tool having;
  a forward end configured for clearing unwanted material from a live well,
  an aft end configured to engage with a hammer device when in use,
  a number of working surfaces configured to bear against and to cut through or to break up the unwanted material when in use,
  at least one bypass passage through which fluid from the live well is able to pass through the clearing tool when in use,
  at least one exhaust passage which communicates with the hammer device and which receives exhaust gases from the hammer device and which communicates with one or more exhaust exit ports, through which exhaust gases from the hammer device are able to exit through the clearing tool when in use, and
  wherein the location of at least one exhaust exit port is a location that is situated aft of a forward front face of the forward end of the clearing tool.

Preferably the location of at least one exhaust exit port is a location that is situated between the working surfaces and the aft end.

Preferably the clearing tool includes one or more peripheral bypass passages that are situated about a periphery of the clearing tool.

Preferably the or each peripheral bypass passage is a bypass passage that passes between adjacent working surfaces of the clearing tool.

Preferably the clearing tool includes one or more central bypass passages that have at least one central bypass entry port that is located at the forward end and is situated at or adjacent to a principal axis of the clearing tool.

Preferably the clearing tool includes one or more central bypass passages that pass through a centre region of a front face of the clearing tool.

Preferably the central bypass passage includes one or more central bypass exit passages that have central bypass exit ports that are located between the working surfaces and the aft end.

Preferably a total cross sectional area of the central bypass exit port or ports is substantially the same as, or within twenty percent of, a total cross sectional area of the central bypass entry port or ports.

Preferably the or each central bypass passage communicates with the or each exhaust passage.

Preferably the clearing tool includes a common or intermediate passage through which exhaust gases or bypass fluids can flow, the common or intermediate passage connecting a primary exhaust passage with the central bypass passage.

Preferably the primary exhaust passage, the central bypass passage, and the common passage are all substantially aligned and allow exhaust gases to exit out of the forward end of the clearing tool when the pressure of the exhaust gases exceeds the pressure of any bypass gases that may be present in the vicinity of the clearing tool when in use.

Preferably the central bypass passage includes one or more bypass exit passages that are generally aligned at an acute angle relative to an intended direction of flow of any exhaust gases when exhaust gases flow through the common passage.

Preferably the or each bypass exit passages is aligned at an angle in the range of forty to seventy degrees relative to the direction of flow of any exhaust gases when exhaust gases flow through the common passage.

Preferably the primary exhaust passage communicates with one or more secondary exhaust exit passages that have a flow direction that is substantially radial with respect to the principal axis of the clearing tool.

Preferably a transition between the primary exhaust passage and the or each secondary exhaust exit passage includes a right angled bend in the flow path of the exhaust gases.

Preferably the right angled bend in the flow path of the exhaust gases is situated at a transition between the primary exhaust passage and the or each secondary exhaust exit passage.

Preferably the or each secondary exhaust exit passage culminates in a secondary exhaust port, the or each secondary exhaust port being situated in a location that is between the working surfaces and the aft end of the clearing tool.

Optionally the or each central bypass passage is isolated from the or each primary exhaust passage.

Preferably the clearing tool includes at least one exhaust entry port that is situated at or adjacent to the principal axis of the clearing tool.

Preferably the or each exhaust entry port is located on an aft face of the aft end of the clearing tool.

Preferably a total cross sectional area of the exhaust exit port or ports that are located between the working surfaces and the aft end is substantially the same, or within twenty percent, of a cross sectional area of the exhaust entry port.

Preferably the working surfaces are situated at or adjacent the forward end.

Preferably the working surfaces include inserts made of material that is harder than the material forming a body portion of the clearing tool.

Preferably the clearing tool is in the form of a drill bit.

Preferably the working surfaces form cutting features of the clearing tool.

Preferably the working surfaces of the clearing tool are a part of a cutting section of the clearing tool, and the cutting section includes cutting features configured to cut material about a full circumference defined by an outer diameter of the cutting section of the clearing tool.

Preferably the cutting section includes a plurality of circumferentially aligned rows of working surfaces.

Preferably the or each row of working surfaces has a substantially similar outside diameter.

Preferably the or each row of working surfaces is spaced apart from any adjacent row of working surfaces in a direction parallel to the longitudinal axis of the tool.

Preferably the or each circumferentially aligned row of working surfaces includes at least one passage which forms at least a part of the peripheral bypass passage.

Preferably the or each peripheral bypass passage includes passages through each circumferentially aligned row of working surfaces.

Preferably the or each peripheral bypass passage of each row of working surfaces is/are offset circumferentially from the or each peripheral bypass passage of an adjacent row of working surfaces.

Preferably the or each peripheral bypass passage in a row of working surfaces is an external groove which extends longitudinally through its associated row of working surfaces.

Preferably the clearing tool includes two rows of working surfaces.

Preferably the clearing tool includes a waisted section between each adjacent row of working surfaces.

Preferably the or each waisted section forms a part of the or each peripheral bypass passage.

The invention may also broadly be said to consist in the parts, elements and features referred to or indicated in the specification of the application, individually or collectively, and any or all combinations of any two or more of the parts, elements or features, and where specific integers are mentioned herein which have known equivalents, such equivalents are incorporated herein as if they were individually set forth.

DESCRIPTION

Further aspects of the present invention will become apparent from the following description which is given by way of example only and with reference to the accompanying drawings in which.

FIRST EXAMPLE

With reference to FIGS. 1 to 5, a first example of a clearing tool (11) according to the present invention will now be described. The tool (11) has a circular cross section and has been designed primarily for use in clearing mineral deposits from the inside of the bores of wells and pipes used in the geothermal industry. The clearing tool (11) is designed for use in clearing live wells or bores, and for use with a 'down the hole' drilling hammer.

The clearing tool (11) has a forward end (13) that is configured for clearing unwanted material from the entire internal circumference of the liner of a live well. The clearing tool (11) also has a aft end (15) which includes a driver engagement section (16) that is configured to engage with a hammer device, for example a conventional 'down the hole' style of hammer used in drilling operations.

The clearing tool (11) has a number of cutting features in the form of hard wearing working surfaces (17) that are configured to bear against and to cut through or to break up the unwanted material, such as mineral build-ups, from the inside of a well.

The clearing tool (11) is in the form of a drill bit, and the working surfaces (17) are situated at or adjacent the forward end (13) and the working surfaces (17) are a part of a cutting section (19) of the clearing tool (11). The working surfaces (17) include inserts (21) made of material that is harder than the material forming a body portion (23) of the clearing tool (11), for example inserts (21) in the form of buttons made of tungsten carbide.

The clearing tool (11) has a number of bypass passages through which fluid from a live well is able to pass through or about the clearing tool (11). In this example, the bypass passages include a central bypass passage (25) and a number of peripheral bypass passages (27). The peripheral bypass passages (27) are situated about a periphery of the clearing tool (11), and they are bypass passages that allow fluids to pass between adjacent working surfaces (17) of the clearing tool (11).

The clearing tool (11) also has a primary or common exhaust passage (29) which communicates with the hammer device. The primary exhaust passage (29) starts at an exhaust entry port (31) situated on an aft face (32) of the aft end (15) of the clearing tool (11). Exhaust gases from a pneumatically operated hammer device are able to pass through the primary exhaust passage (29) and to exit the clearing tool (11) through two alternative paths. The exhaust gases can exit through a primary exhaust exit port (33) that is located at the forward end (13) of the clearing tool (11), or through a number of secondary exhaust exit ports (34) that are located in the body (13) of the tool and aft of the cutting section (19). The secondary exhaust exit ports (34) are situated aft of a forward face of the forward end (13) of the clearing tool (11), and in this example are located between the working surfaces (17) or the cutting section (19), and the driver engagement section (16) or the aft end (15).

It can be said that the clearing tool (11) includes a system of exhaust passages that culminates in a number of exhaust exit ports. The exhaust gases from a hammer device that is driving the clearing tool (11) have two exit options through the tool. The system of exhaust passages includes a straight through option where the primary exhaust passage (29) culminates at, or communicates with, the primary exhaust exit port (33). And the system of exhaust passages includes a bent flow option in which the exhaust gases primarily follow through a bent path which culminates at the secondary exhaust exit ports (34).

The exhaust gases primarily flow out the straight through option when the pressure of the exhaust gases exceeds the pressure of any fluids that are originating from a live well that is being cleared and which are be bypassing the clearing tool (11). And the exhaust gases primarily flow out through the alternative or bent option when flow out through the primary exhaust passage (29) is hindered by bypass fluids that are flowing past the clearing tool (11) which have a higher pressure than the pressure of the exhaust gases. Further details of the exhaust flow paths will be explained below.

The central bypass passage (25) has a central bypass entry port (35) that is located at the forward end (13) and is situated about a principal axis (37) of the clearing tool (11), and allows flow in a generally axial direction through the central bypass entry port (35) and through the central bypass passage (25). Because the central bypass passage (25) is located within a centre region of a front face (39) of the clearing tool (11), high pressure gases or steam are able to bypass the tool (11) through its centre, and do not always have to pass around its periphery as with prior art drill bits. This feature is particularly helpful when the clearing tool (11) encounters a thick or particularly hard section of mineral build-up, which is typically situated about the internal walls of a bore, and which can tend to block the peripheral bypass passages.

The central bypass passage (25) includes a number of central bypass exit passages (41) that each culminate in central bypass exit ports (43). The central bypass exit ports (43) are located between the working surfaces (17) or the cutting section (19) and driver engagement section (16) or the aft end (15).

The clearing tool (11) has been designed in such a way that a total cross sectional area of the central bypass exit ports (43) is substantially the same, or within twenty percent, of a total cross sectional area of the central bypass entry port (35).

The example shown is a clearing tool (11) having an outside diameter of approximately one hundred and forty millimetres. The clearing tool (11) has a single central bypass entry port (35) having an internal diameter of fifty millimetres, and has four central bypass exit ports (43), each having a diameter of twenty eight millimetres. The internal diameter of the central bypass entry port (35) is approximately one third the outside diameter of the clearing tool (11).

In this example, the central bypass passage (25) communicates with the primary exhaust passage (29) via a common or intermediate passage (45), that is, the primary exhaust passage (29) is connected to the central bypass passage (25) by the common or intermediate passage (45). Either exhaust gases or bypass fluids can flow through the common passage (45) depending on which have the highest pressure when the clearing tool (11) is in use. This feature allows exhaust gases to exit through the primary exhaust port (33) in situations where the pressure in a live well is relatively low, and this feature has the advantage that it allows the exhaust gases from the hammer to be used to clear debris from about the cutting section (19) and to push the debris out of the bore if required.

It can be seen in the Figures that the primary exhaust exit port (33) also doubles as the central bypass entry port (35). The primary exhaust passage (29), the central bypass passage (25), and the common passage (45) are all substantially aligned and allow exhaust gases to exit out of the forward end (13) of the clearing tool (11) when the pressure of the exhaust gases exceeds the pressure of any bypass gases that may be present in the vicinity of the clearing tool (11) when it is being used in a live well. That is, the primary exhaust passage (29), the common passage (45) and the central bypass passage (25) combine to provide a conduit for the straight through flow option for the exhaust gases.

The central bypass exit passages (41) extend from the central bypass passage (25) at an angle to the flow direction through the central bypass passage (25). The central bypass exit passages (41) direct the flow of bypass fluids in a more radial direction, the direction of the flow through the central bypass exit passages (41) being at an angle of forty to seventy degrees to the principle axis (37) of the clearing tool (11). In the example shown the central bypass exit passages (41) are each at an angle of approximately fifty five to sixty degrees to the principle axis (37). This gives the central bypass gases a relatively unhindered flow though the body (23) of the clearing tool (11).

It is also worth noting that the central bypass exit passages (41) are at an acute angle of approximately fifty five to sixty degrees relative to the direction of flow of exhaust gases when exhaust gases flow through the common passage (45). This means that the exhaust gases would need to turn through an angle of approximately one hundred and twenty to one hundred and twenty five degrees to flow out the central bypass exit passages (41). For this reason, only a small percentage of the exhaust gases are expected to ever exit the clearing tool (11) via the central bypass exit passages (41). When the pressure of the bypass fluids is lower than the pressure of the exhaust gases, the exhaust gases will primarily flow out through the primary exhaust exit port (33) and act as clearing fluid for the cleaning tool (11).

As noted above, the system of exhaust passages of the clearing tool (11) also includes an alternative bent flow path. In this bent flow path, the primary exhaust passage (29) communicates with a number of secondary exhaust exit passages (47). That is, when flowing along the bent flow path, the exhaust gases first flow along the primary exhaust passage (29) and then transition into the secondary exhaust exit passages (47) that have a flow direction that is substantially radial with respect to the principal axis (37) of the clearing tool (11). This radial direction of flow of the exhaust gases allows a possible venturi effect from the bypass fluids to aid in the extraction of the exhaust gases.

The exhaust entry port (31) that is situated at or adjacent to the principal axis (37) of the clearing tool (11), and a transition between the primary exhaust passage (29) right and the secondary exhaust exit passages (47) includes a right angled bend in the flow path of the exhaust gases. The right angled bend in the flow path of the exhaust gases is situated at the transition between the primary exhaust passage (29) and the secondary exhaust exit passages (47). The secondary exhaust exit passages (47) each culminate in a secondary exhaust port (34). The secondary exhaust ports (34) are situated in an aft portion of the body (23) and in a location that is between the working surfaces (17) and the aft end (15) of the clearing tool (11).

A total cross sectional area of the secondary exhaust exit ports (34) is substantially the same, or within twenty percent, of a cross sectional area of the exhaust entry port (31).

The cutting section (19) includes a plurality of circumferentially aligned rows of working surfaces. Each row of working surfaces (17) has a substantially similar outside diameter.

Each row of working surfaces (17) is spaced apart from any adjacent row of working surfaces in a direction parallel to the principal or longitudinal axis (37) of the tool (11).

Each circumferentially aligned row of working surfaces includes bypass passages (49) that form a part of the peripheral bypass passage (27). Each bypass passage (49) of each row of working surfaces are offset circumferentially from the similar bypass passages (49) of an adjacent row of working surfaces. The bypass passages in each row of working surfaces (17) is an external groove which extends longitudinally through its associated row of working surfaces (17).

In this example, the clearing tool (11) includes two rows of working surfaces, and the clearing tool (11) includes a waisted section (51), or 'junk slot', between each adjacent row of working surfaces (17). The waisted section (51) forms a part of the peripheral bypass passage (27).

SECOND EXAMPLE

Figure 1:
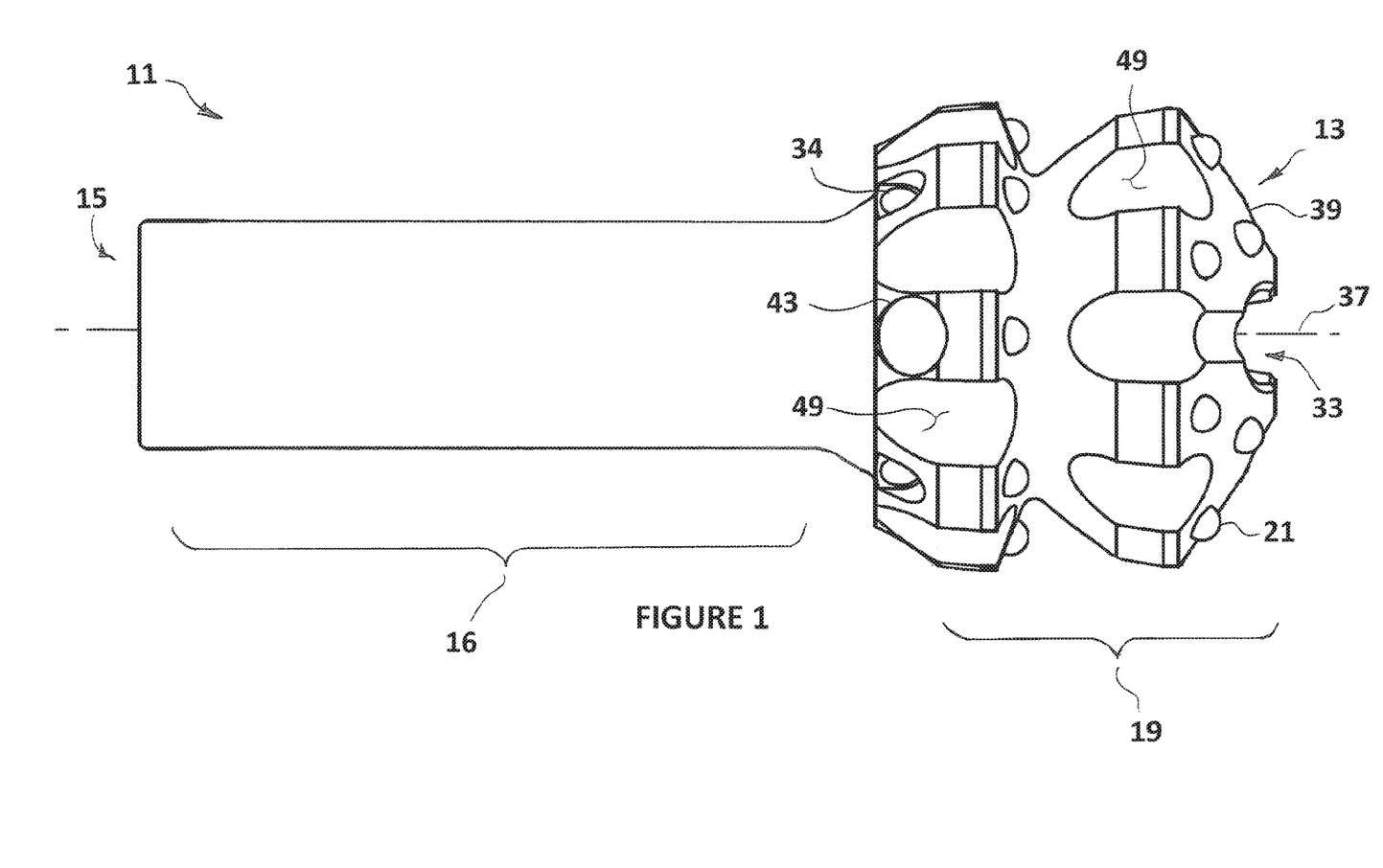
FIG. 1 is a side elevation view of a first example of a clearing tool according to the present invention.
Figure 2:
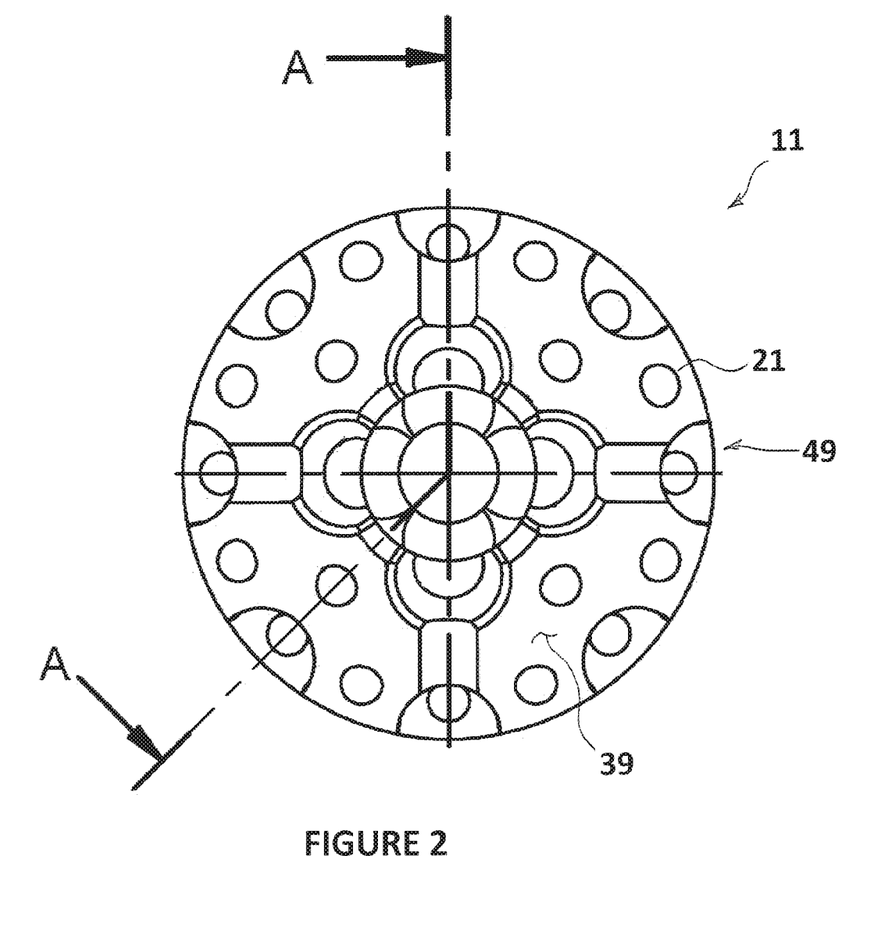
FIG. 2 is a front end elevation view of the first example of a clearing tool in which a section plane AA is defined.
Figure 3:
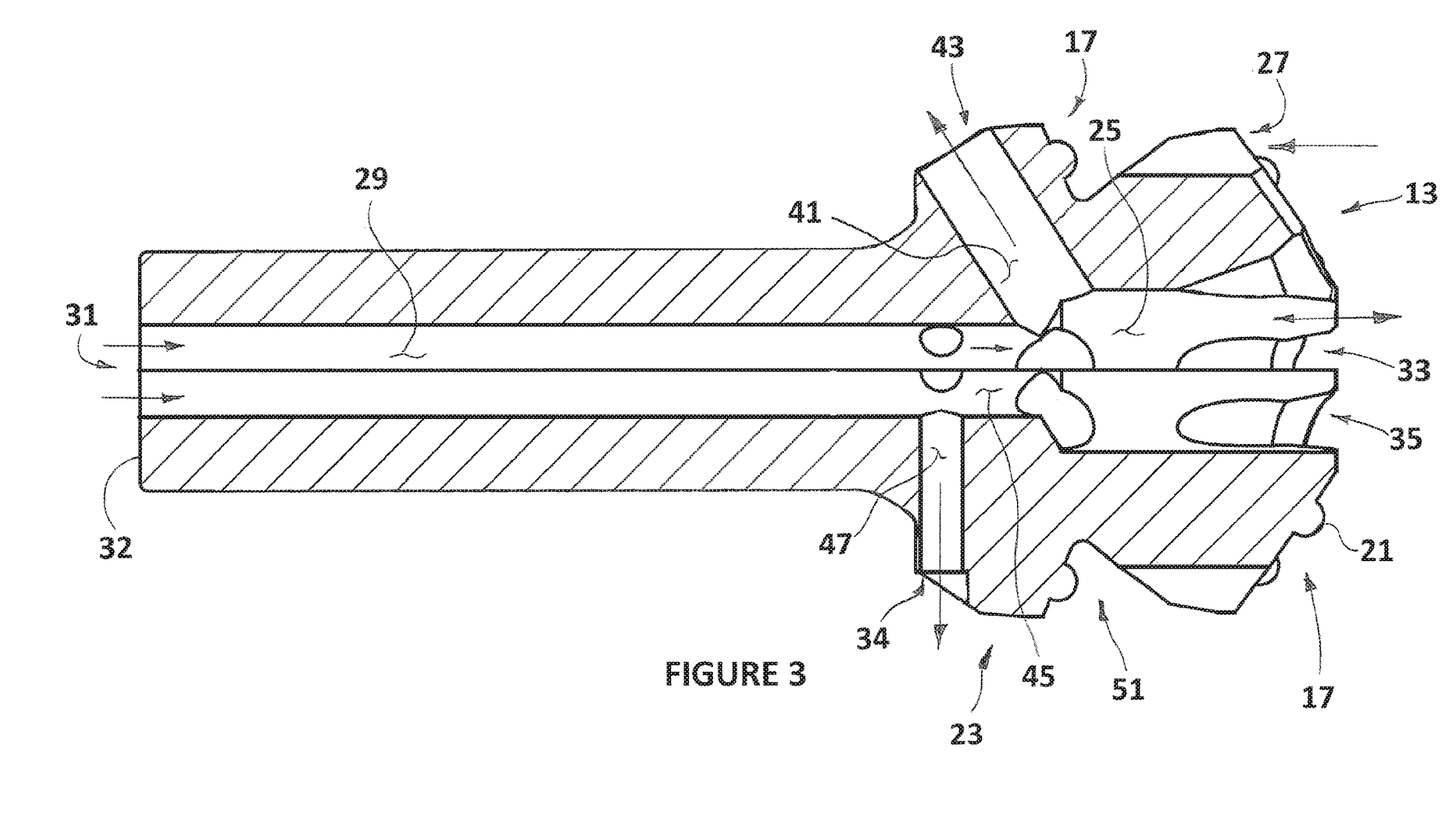
FIG. 3 is a cross sectional view AA as defined in FIG. 2.
Figure 4:
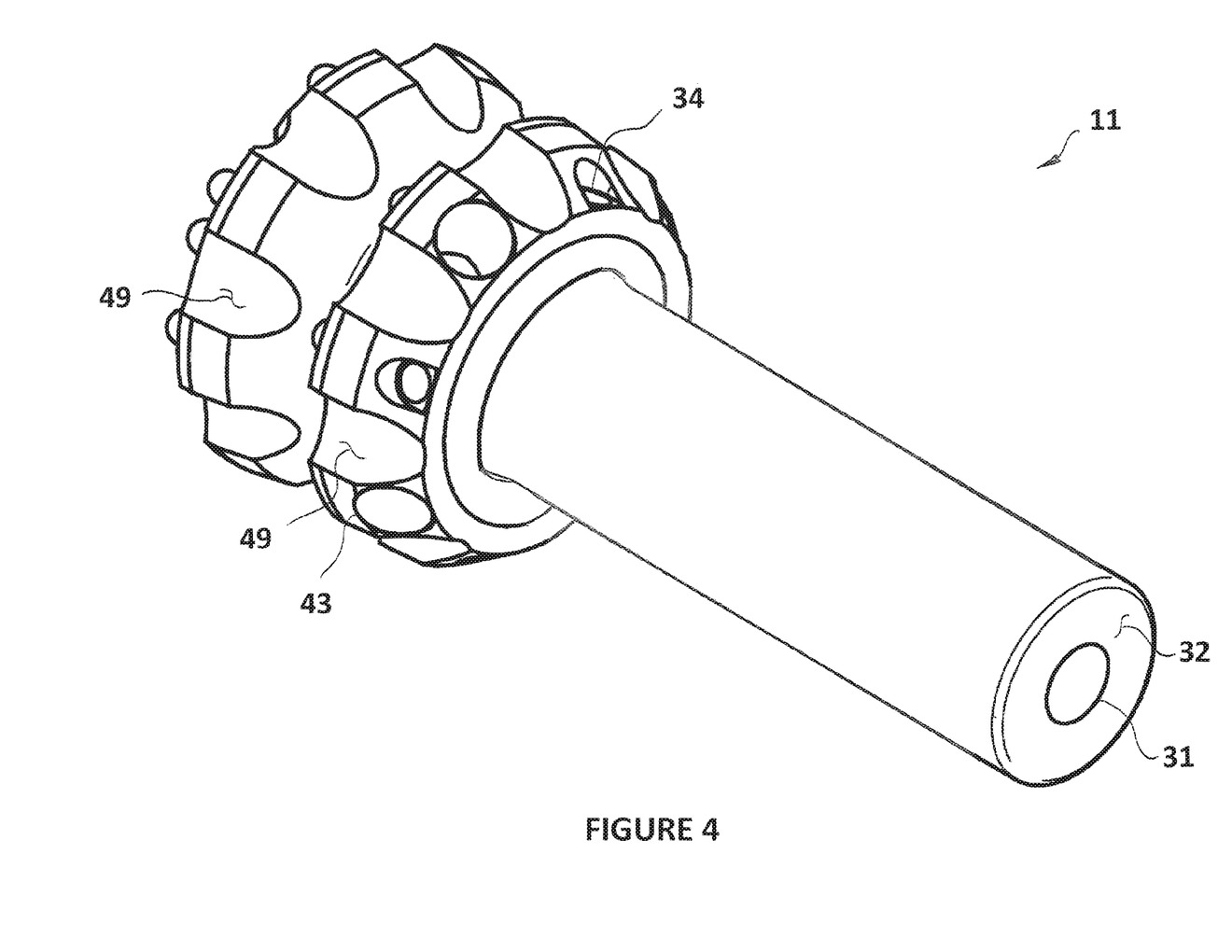
FIG. 4 is an aft perspective view of the first example of a clearing tool.
Figure 5:
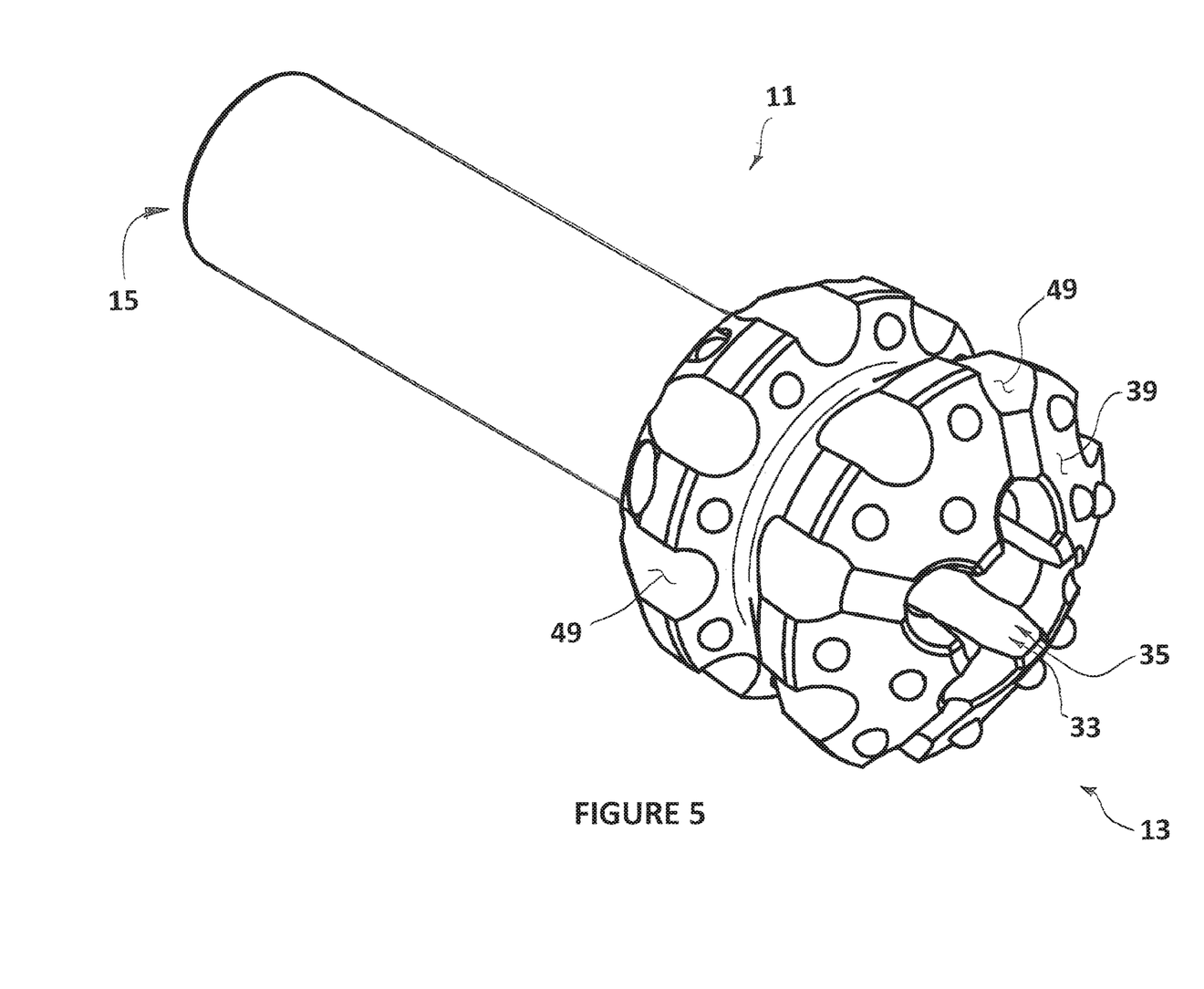
FIG. 5 is a front perspective view of the first example of a clearing tool.
Figure 6:
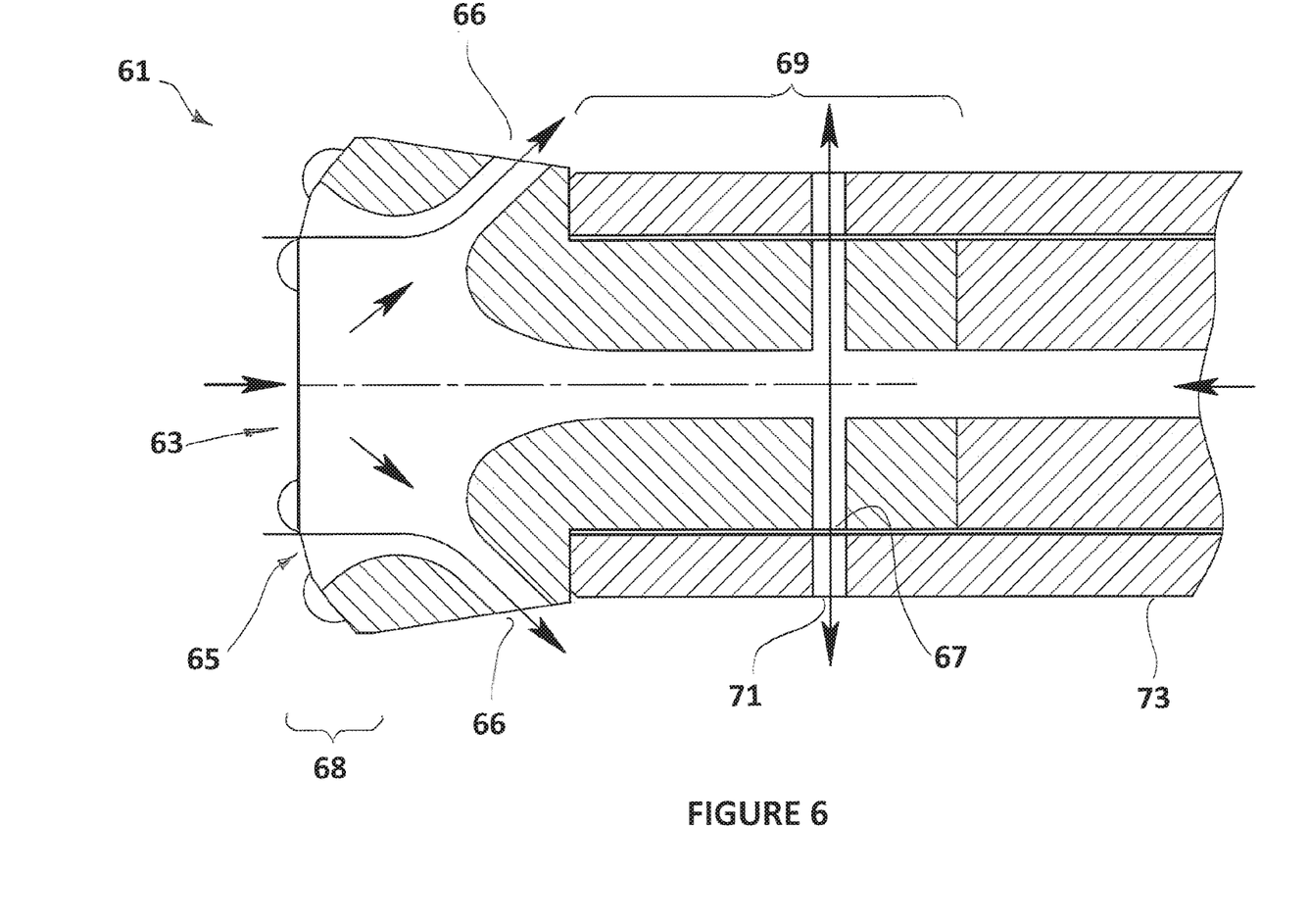
FIG. 6 is a cross sectional view of a second example of a clearing tool according to the present invention.

With reference to FIG. 6, a second example of a clearing tool (61) will now be described. The second example of a clearing tool (61) is similar to the first example of a clearing tool (11) described herein, but has a number of differences that will be explained as follows.

The first significant difference is the size of a central bypass entry port (63) located in a front face (65) of the tool (61). A diameter of the central bypass entry port (63) is more than fifty percent of the diameter of the front face (65) of the tool (61), allowing even less restriction for gases from a live geothermal well to bypass the tool (61). The bypass gases exit the tool (101) via bypass exit ports (66) that are located immediately aft of the working section (68) of the tool (61).

A second important difference is the location of a series of exhaust ports (67). The exhaust ports (67) are located within a driver engagement section (69) of the tool (61), and the exhaust ports (67) are aligned with corresponding hammer exhaust ports (71). In this way, the exhaust gases from the hammer (73) are able to exit well aft of the front face (65) of the tool (61).

THIRD EXAMPLE

Figure 7:
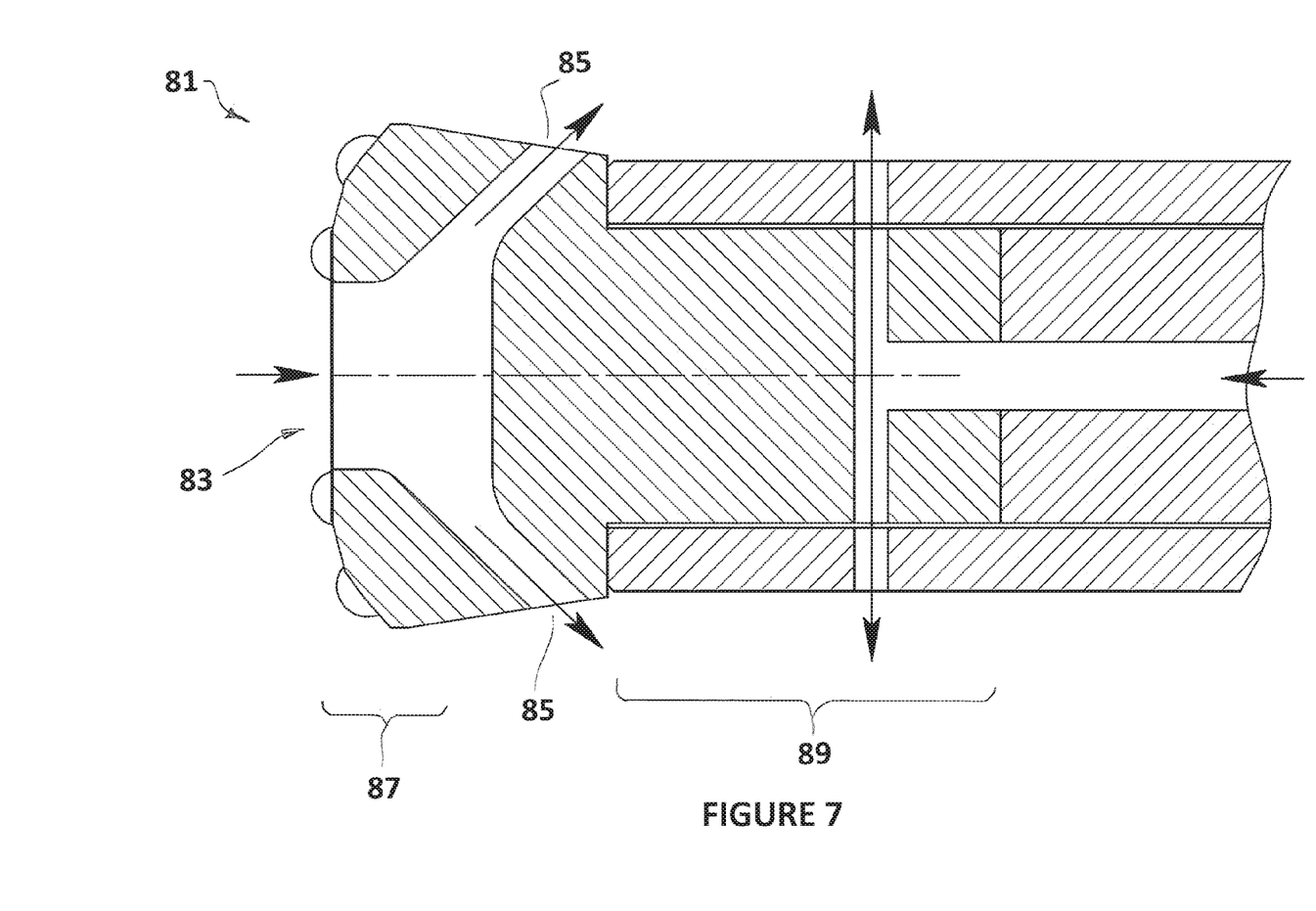
FIG. 7 is a cross sectional view of a third example of a clearing tool according to the present invention.

With reference to FIG. 7, a third example of a clearing tool (81) will now be described. The third example of a clearing tool (81) has similarities to both the first example of a clearing tool (11) and the second example of a clearing tool (61) described herein, as will be apparent from the drawing.

A significant difference however is a complete separation between the exhaust passages and the bypass passages. In this example the bypass gases enter the tool (81) via a central bypass entry port (83) and these gases exit the tool (81) via bypass exit ports (85) that are located immediately aft of the working section (87) of the tool (81). But there is no common or intermediate passage connecting the bypass passages with the exhaust passages.

In this third example, the exhaust gases exit the tool (81) in a similar manner that they do in the second example of a clearing tool (61), the exit being located well aft of the working section (87) and being situated within the driver engagement section (89).

FOURTH EXAMPLE

Figure 8:
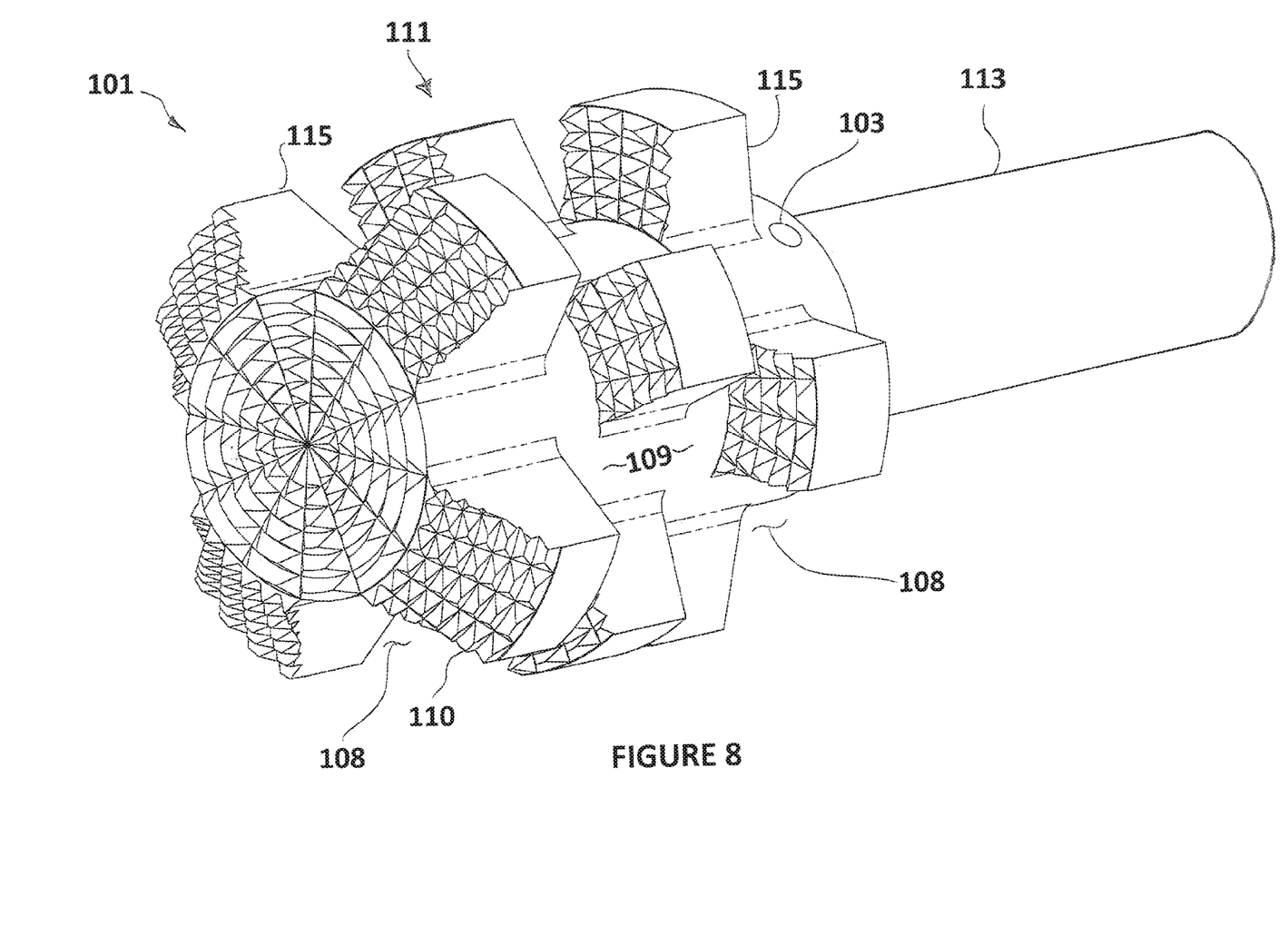
FIG. 8 is a perspective view of a fourth example of a clearing tool according to the present invention.
Figure 9:
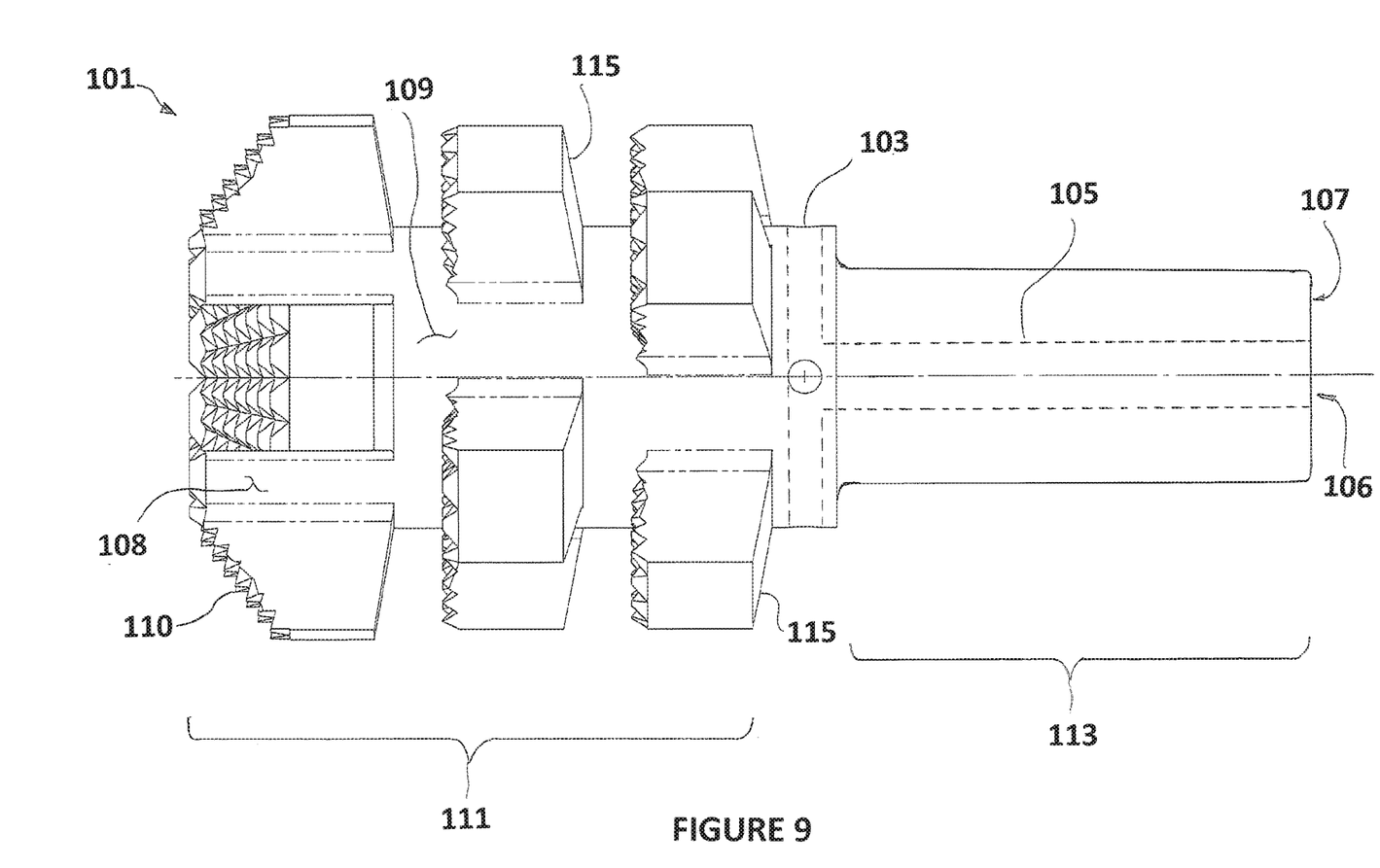
FIG. 9 is a side elevation view of the fourth example of a clearing tool.

With reference to FIGS. 8 and 9, a fourth example of a clearing tool (101) will now be described. The fourth example of a clearing tool (101) has four exhaust ports (103) that each communicate with an internal exhaust passage (105). The internal exhaust passage (105) receives exhaust gases from a hammer that is driving the clearing tool (101). The exhaust gases enter the exhaust passage (105) through an exhaust entry port (106) that is located on an aft face of the aft end (107) of the clearing tool (101). The exhaust gases are able to escape through the exhaust ports (103) which are situated between the working surfaces (110) of the tool (101) and the aft end (107).

The clearing tool (101) has large peripheral bypass passages (108) rather than a large central bypass passage as used in the first example of a clearing tool (11) described herein. In this example, steam or gases from a live well are able to bypass the clearing tool (101) about a narrow body section (109) of the clearing tool (101) and through the peripheral bypass passages (108) that run between adjacent working surfaces (110).

Importantly, the exhaust gases from a hammer are able to exit the clearing tool (101) in a location that is aft of a cutting section (111) of the tool (101). And in this case, the exit of the exhaust gases is forward of a driver engagement section (113) of the tool (101). This allows the exhaust gases from a hammer to exit the clearing tool (101) with less resistance than if the exhaust gases had to face the steam or gases from a live well head on.

The body section (109) is a solid cylindrically shaped part of the tool (101) from which a number of cutting arms (115)

protrude, twelve arms (115) in three rows of four in this case. The cutting arms (115) are sometimes referred to as cutting wings, or perhaps more often as cutting blocks. The forward or working faces of each cutting arm (115) are provided with cutting formations such as the pyramid shaped formations shown in the figures or alternatively tungsten carbide inserts or similar hard inserts configured to break the mineral deposits.

In this example, the tool (101) has three circumferentially aligned rows, each containing four equally spaced arms (115). In this way, each set or row of four arms (115) presents a cross shaped cutting surface. Each successive row of four arms (115) is offset, or is indexed circumferentially, relative to the preceding row of four arms (115). And in this way the tool (101) is able to clear the entire inner circumference of the liner within a geothermal well, and yet gases are able to bypass the cutting surfaces (110) by snaking their way between and through successive rows of arms (115).

Variations

Aspects of the present invention have been described by way of example only and it should be appreciated that modifications and additions may be made thereto without departing from the scope thereof.

It is envisaged that in an alternative embodiment, a clearing tool according to the present invention could have just one bypass passage, for example a relatively large central bypass passage.

The examples described herein have been described for use in wells having pressurised fluid in the form of steam or gas, however it is envisaged that the clearing tools could also be used in live wells containing water or oil under pressure.

It is also envisaged that in an alternative embodiment a clearing tool could have a central bypass passage or passages that is/are isolated from the exhaust passage. For example, a clearing tool could include a number of axially aligned bores that pass through the cutting section, but which are situated about a central exhaust passage.

In the example shown and described above, the clearing tool (11) has two rows of cutting features. However, it is envisaged that a single row of cutting features, or three or more rows of cutting features could be used.

Definitions

Throughout this specification the word "comprise" and variations of that word, such as "comprises" and "comprising", are not intended to exclude other additives, components, integers or steps.

Advantages

Thus it can be seen that at least the preferred form of the invention provides a well or bore clearing tool which has one or more of the following advantages;
the clearing tool is better suited than previously used drilling tools for the purpose of clearing live geothermal wells, and
the pressure from the gases escaping from a live geothermal well have less of a detrimental effect on the performance of the drill bit and of the hammer driving the drill bit.

The invention claimed is:
1. A clearing tool for clearing live wells or bores, the clearing tool comprising:
a forward end configured for clearing unwanted material from a live well,
an aft end configured to engage with a hammer device when in use,
a number of working surfaces configured to bear against and to cut through or to break up the unwanted material when in use,
at least one bypass passage through which fluid from the live well is able to pass through the clearing tool when in use,
at least one exhaust passage which communicates with the hammer device and which receives exhaust gases from the hammer device and which communicates with one or more exhaust exit ports, through which exhaust gases from the hammer device are able to exit through the clearing tool when in use, and
at least one of the bypass passages is a central bypass passage having a central bypass entry port and one or more central bypass exit passages,
wherein when the clearing tool is in use the central bypass entry port allows fluid from the live well to pass through a center region of a front face of the forward end of the clearing tool,
wherein when the clearing tool is in use fluid from the live well can flow through the central bypass entry port and through the central bypass passage in a generally axial direction, and the or each central bypass exit passage directs the flow of the fluid from the live well in a more radial direction by extending from the central bypass passage at an angle to a direction of flow through the central bypass passage, and
the location of at least one exhaust exit port is a location that is situated aft of the front face, and
wherein when the clearing tool is in use the exhaust gases from the hammer device are able to exit the clearing tool separately through the one or more exhaust exit ports while the fluid from the live well is passing through the or each central bypass passage and is exiting the clearing tool through the or each central bypass exit passage.

2. A clearing tool as claimed in claim 1, wherein the location of at least one exhaust exit port is a location that is situated between the working surfaces and the aft end.

3. A clearing tool as claimed in claim 1, wherein at least one of the bypass passages of the clearing tool is a peripheral bypass passage that is situated about a periphery of the clearing tool.

4. A clearing tool as claimed in claim 3, wherein the or each peripheral bypass passage passes between adjacent working surfaces of the clearing tool.

5. A clearing tool as claimed in claim 3, wherein the working surfaces of the clearing tool are a part of a cutting section of the clearing tool, and the cutting section includes a plurality of circumferentially aligned rows of working surfaces.

6. A clearing tool as claimed in claim 5, wherein the or each row of working surfaces is spaced apart from any adjacent row of working surfaces in a direction parallel to the longitudinal axis of the tool.

7. A clearing tool as claimed in claim 5, wherein the or each circumferentially aligned row of working surfaces includes at least one passage which forms at least a part of the peripheral bypass passage.

8. A clearing tool as claimed in claim 1, wherein the central bypass entry port is situated at or adjacent to a principal axis of the clearing tool.

9. A clearing tool as claimed in claim 1, wherein an inside diameter of the central bypass entry port is at least a third of the size of an outside diameter of the clearing tool.

10. A clearing tool as claimed in claim 1, wherein the or each central bypass exit passage culminates in a central bypass exit port, and the or each central bypass exit port is located between the working surfaces and the aft end.

11. A clearing tool as claimed in claim 1, wherein a total cross-sectional area of the central bypass exit port or ports is substantially the same as, or within twenty percent of, a total cross sectional area of the central bypass entry port.

12. A clearing tool as claimed in claim 1, wherein the central bypass passage also communicates with the or each exhaust passage.

13. A clearing tool as claimed in claim 12, wherein the clearing tool includes a common or intermediate passage through which exhaust gases or bypass fluids can flow, the common or intermediate passage connecting a primary exhaust passage with the central bypass passage.

14. A clearing tool as claimed in claim 13, wherein the primary exhaust passage, the central bypass passage, and the common passage are all substantially aligned and allow exhaust gases to exit out of the forward end of the clearing tool when the pressure of the exhaust gases exceeds the pressure of any bypass gases that may be present in the vicinity of the clearing tool when in use.

15. A clearing tool as claimed in claim 13, wherein each central bypass exit passage is generally aligned at an acute angle relative to an intended direction of flow of any exhaust gases when the clearing tool is in use and exhaust gases flow through the common passage.

16. A clearing tool as claimed in claim 13, wherein the primary exhaust passage communicates with one or more secondary exhaust exit passages that have a flow direction that is substantially radial with respect to the principal axis of the clearing tool.

17. A clearing tool as claimed in claim 16, wherein the or each secondary exhaust exit passage culminates in a secondary exhaust port, the or each secondary exhaust port being situated in a location that is between the working surfaces and the aft end of the clearing tool.

18. A clearing tool as claimed in claim 1, wherein the working surfaces include inserts made of material that is harder than the material forming a body portion of the clearing tool.

19. A clearing tool as claimed in claim 1, wherein the clearing tool has a plurality of central bypass exit passages.

20. A clearing tool as claimed in claim 1, wherein the direction of the flow through each central bypass exit passage when the clearing tool is in use, is at an angle of forty to seventy degrees to the principle axis of the clearing tool.

* * * * *